(12) United States Patent (10) Patent No.: US 8,742,784 B2
Kim et al. (45) Date of Patent: Jun. 3, 2014

(54) ORGANIC LIGHT EMITTING DISPLAY DEVICE

(75) Inventors: Kwang-Min Kim, Yongin (KR); Won-Kyu Kwak, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 1086 days.

(21) Appl. No.: 12/759,593

(22) Filed: Apr. 13, 2010

(65) Prior Publication Data

US 2011/0050660 A1 Mar. 3, 2011

(30) Foreign Application Priority Data

Sep. 2, 2009 (KR) ........................ 10-2009-0082448

(51) Int. Cl.
*G01R 31/26* (2006.01)

(52) U.S. Cl.
USPC ............... 324/760.01; 324/762.01; 324/750.3

(58) Field of Classification Search
None
See application file for complete search history.

(56) References Cited

U.S. PATENT DOCUMENTS

| | | | |
|---|---|---|---|
| 4,890,052 A * | 12/1989 | Hellums | 323/315 |
| 5,235,312 A | 8/1993 | Sandhu et al. | |
| 5,717,559 A * | 2/1998 | Narita | 361/56 |
| 6,023,260 A * | 2/2000 | Higashi | 345/100 |
| 6,376,896 B1 | 4/2002 | Shiiki et al. | |
| 6,563,194 B1 * | 5/2003 | Sakamoto | 257/577 |
| 7,342,453 B2 * | 3/2008 | Amasuga et al. | 330/277 |
| 7,388,397 B2 * | 6/2008 | Tomita | 324/760.02 |
| 7,570,072 B2 * | 8/2009 | Hata et al. | 324/760.01 |
| 2004/0145556 A1 | 7/2004 | Nakanishi | |
| 2005/0024100 A1 | 2/2005 | Date et al. | |
| 2005/0057273 A1 * | 3/2005 | Lin et al. | 324/770 |
| 2006/0181259 A1 | 8/2006 | Sudoh et al. | |
| 2006/0274464 A1 | 12/2006 | Chen | |
| 2006/0279510 A1 | 12/2006 | Lai | |
| 2007/0001711 A1 | 1/2007 | Kwak | |

(Continued)

FOREIGN PATENT DOCUMENTS

| CN | 1924963 A | 3/2007 |
|---|---|---|
| CN | 1928681 A | 3/2007 |

(Continued)

OTHER PUBLICATIONS

European Office action dated Oct. 25, 2012, for corresponding European Patent application 10171005.1, (7 pages).

(Continued)

*Primary Examiner* — Richard Isla Rodas
(74) *Attorney, Agent, or Firm* — Christie, Parker & Hale, LLP

(57) ABSTRACT

An organic light emitting display device having a lighting test circuit. The organic light emitting display device includes: a pixel unit including pixels at crossing regions of scan lines and data lines; a scan driving circuit configured to supply scan signals to the scan lines; and a lighting test circuit configured to supply lighting test signals to the data lines, the lighting test circuit including a plurality of transistors, the plurality of transistors including source electrodes, drain electrodes, and gate electrodes, the source electrodes being coupled, in common, to input lines to which the lighting test signals are input, the drain electrodes being coupled to the data lines, the gate electrodes being coupled, in common, to an input line of test control signals, and the gate electrodes and the source electrodes being coupled through a resistor composed of a semiconductor material.

8 Claims, 3 Drawing Sheets

(56) References Cited

U.S. PATENT DOCUMENTS

| | | |
|---|---|---|
| 2007/0046581 A1* | 3/2007 | Kwak et al. ............... 345/68 |
| 2007/0139312 A1 | 6/2007 | Kwak |
| 2007/0262929 A1 | 11/2007 | Kim et al. |
| 2008/0054798 A1* | 3/2008 | Jeong et al. ............... 313/504 |
| 2008/0068309 A1 | 3/2008 | Kwak et al. |
| 2008/0111803 A1 | 5/2008 | Lee et al. |
| 2009/0283774 A1 | 11/2009 | Shin et al. |

FOREIGN PATENT DOCUMENTS

| | | | |
|---|---|---|---|
| EP | 1 355 354 A1 * | 10/2003 | ............. H01L 27/02 |
| EP | 1 763 014 A1 | 3/2007 | |
| EP | 1 843 318 A2 | 10/2007 | |
| EP | 1 892 695 A2 | 2/2008 | |
| EP | 2 120 265 A1 | 11/2009 | |
| GB | 2 113 469 A | 8/1983 | |
| JP | 11-109409 | 4/1999 | |
| JP | 2001-133807 | 5/2001 | |
| KR | 10-2006-0047938 A | 5/2006 | |
| KR | 10-2006-0078152 A | 7/2006 | |

OTHER PUBLICATIONS

Office Action dated Apr. 18, 2011 for European Patent Application No. 10 171 005.1-1228; 4 pages.

* cited by examiner

ORGANIC LIGHT EMITTING DISPLAY DEVICE

CROSS-REFERENCE TO RELATED APPLICATION

This application claims priority to and the benefit of Korean Patent Application No. 10-2009-0082448, filed on Sep. 2, 2009, in the Korean Intellectual Property Office, the entire content of which is incorporated herein by reference.

BACKGROUND

1. Field

An embodiment of the present invention relates to an organic light emitting display device, and more particularly, to an organic light emitting display device that has a lighting test circuit.

2. Description of Related Art

Recently, various flat panel displays that are lighter in weight and smaller in volume than that of a comparable cathode ray tube, have been developed. A flat panel display can be categorized as a liquid crystal display (LCD) device, a field emission display (FED) device, a plasma display panel (PDP), an organic light emitting display (OLED) device, etc.

An organic light emitting display (OLED) device is a flat panel display that displays an image using organic light emitting diodes that emit light by re-combining electrons and holes, and has a relatively rapid response speed and low power consumption so that it has been spotlighted as a next generation display.

Such an organic light emitting display device includes a pixel unit that includes a plurality of pixels, a scan driving circuit that supplies scan signals to the pixel unit, and a data driving circuit that supplies data signals to the pixel unit.

Here, the pixel unit and the scan driving circuit may be formed together on a panel by utilizing a low temperature poly-si (LTPS) process, and the data driving circuit may be mounted in the form of a driving IC chip on the panel after the LTPS process, etc. is completed.

However, a light test for confirming whether pixels can be normally (properly) lighted should be performed before the driving integrated circuit (IC) with the built-in data driving circuit is mounted. In order to perform such a lighting test, a separate lighting test circuit may be formed on the panel.

The lighting test circuit includes a plurality of switching devices that supply lighting test signals to data lines in accordance with test control signals supplied from the outside. Here, the switching devices may be composed of transistors that are formed during the LTPS process for forming transistors provided in a pixel circuit and a scan driving circuit, etc. In order to enhance manufacturing efficiency, the transistors of the switching devices have the same (or substantially the same) structure as the transistors of the pixel circuit and the scan driving circuit, etc.

However, the transistors provided in the lighting test circuit may be exposed to static electricity (ESD) flowed from the outside so that they may be damaged by static electricity during the LTPS process or even in the module state after the LTPS process is completed.

If the transistors of the lighting test circuit are damaged by static electricity, driving errors of the organic light emitting display device may result and/or the lighting test cannot be effectively performed.

Therefore, in an organic light emitting display device that performs a lighting test with a lighting test circuit before the driving IC is mounted, the lighting test circuit should be protected from damage caused by static electricity during the LTPS process or even in the module state after the LTPS process is completed.

To this end, there is a need to design the transistors of the lighting test circuit in a structure capable of protecting itself from static electricity.

SUMMARY

An aspect of an embodiment of the present invention is directed toward an organic light emitting display device that has a lighting test circuit designed in a structure capable of protecting itself from static electricity.

An embodiment of the present invention provides an organic light emitting display device. The organic light emitting display device includes: a pixel unit including pixels at crossing regions of scan lines and data lines; a scan driving circuit configured to supply scan signals to the scan lines; and a lighting test circuit configured to supply lighting test signals to the data lines, the lighting test circuit including a plurality of transistors, the plurality of transistors including source electrodes, drain electrodes, and gate electrodes, the source electrodes being coupled, in common, to input lines to which the lighting test signals are input, the drain electrodes being coupled to the data lines, the gate electrodes being coupled, in common, to an input line of test control signals, and the gate electrodes and the source electrodes being coupled through a resistor composed of a semiconductor material.

The resistor may be implemented using a high-resistance polysilicon semiconductor.

The resistor may be designed to have resistance value of about 100 kΩ to about 1 MΩ or of 100 kΩ to 1 MΩ.

Further, the resistor may be integrally provided with a channel layer of the transistors. Here, the resistor may be implemented using a polysilicon semiconductor that includes an impurity not included in the channel layer of the transistors or that includes an impurity identical to that included in the channel layer of the transistors but doped at a different concentration from the impurity doped in the channel layer of the transistors.

In addition, the organic light emitting display device may further include a data distribution circuit that is coupled between the lighting test circuit and the data lines to distribute and output the lighting test signals supplied from the lighting test circuit to the data lines during a lighting test period.

Moreover, the organic light emitting display device may further include a driving integrated circuit (IC) that is mounted in a chip form overlapped with the lighting test circuit and has a built-in data driving circuit.

With the embodiment(s) as described above, the gate electrodes and the source electrodes of the transistors provided in the lighting test circuit are connected through resistor(s), making it possible to protect these components from the damage caused by static electricity.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
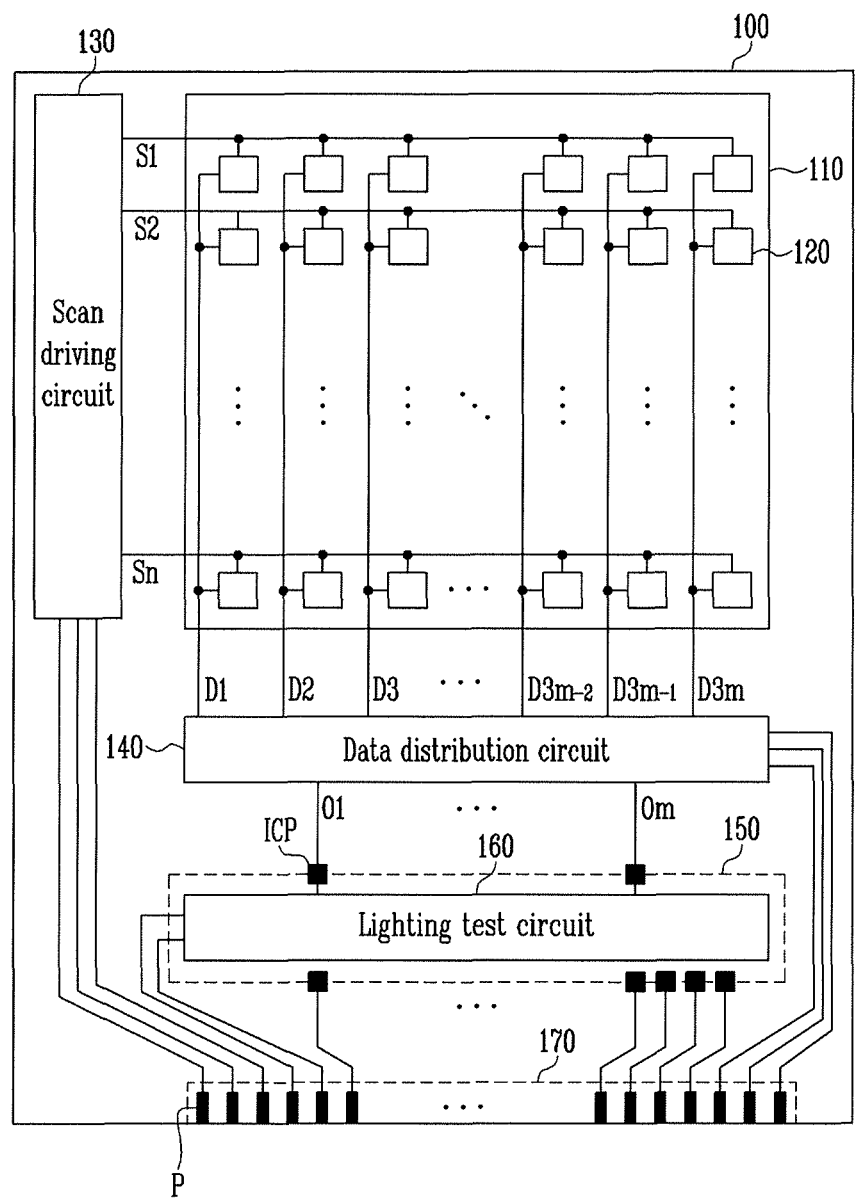
FIG. 1 is a perspective plan view of an organic light emitting display device according to an embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. In addition, when an element is referred to as being "on" another element, it can be directly on the another element or be indirectly on the another element with one or more intervening elements interposed therebetween. Also, when an element is referred to as being "connected to" another element, it can be directly connected to the another element or be indirectly connected to the another element with one or more intervening elements interposed therebetween. Hereinafter, like reference numerals refer to like elements.

Hereinafter, exemplary embodiments according to the present invention will be described in more detail with reference to the accompanying drawings.

FIG. 1 is a perspective plan view of an organic light emitting display device according to an embodiment of the present invention. For convenience of explanation, a panel 100 of the organic light emitting display device before a driving IC is mounted on an IC mounting region 150 will be shown in FIG. 1.

Referring to FIG. 1, the organic light emitting display device includes a pixel unit (display region) 110, a scan driver circuit 130, a data distribution circuit 140, a lighting test circuit 160, and a pad unit 170, formed on the panel 100.

The pixel unit 110 has a plurality of pixels 120 positioned at crossing regions of scan lines S1 to Sn and data lines D1 to D3m. When scan signals are supplied from the scan lines S1 to Sn, the pixels 120 store the data signals supplied from the data lines D1 to D3m to be light-emitted at the brightness corresponding thereto.

The scan driving circuit 130 generates the scan signals by receiving scan driving control signals SCS through the pad unit 170 and supplies the generated scan signals sequentially to the scan lines S1 to Sn. Here, start pulses and clock signals may be included in the scan driving control signals SCS, and the scan driving circuit 130 may be constituted by including shift registers that sequentially generate the scan signals in accordance with the start pulses and the clock signals.

The data distribution circuit 140 is coupled between the lighting test circuit 160 and the data lines D1 to D3m and distributes and outputs the lighting test signals supplied from the lighting test circuit 160 during a lighting test period to the data lines D1 to D3m of the red, green, and blue pixels.

However, the data distribution circuit 140, which is coupled to the lighting test circuit 160 through IC pads ICP, distributes and outputs the data signals from the driving IC to the data signals D1 to D3m during an actual driving period after a driving IC is mounted on the IC mounting region 150. Here, the lighting test circuit 160 is maintained at a turn-off state during the actual driving period.

The lighting test circuit 160 receives test control signals and lighting test signals through the pad unit 170 during the lighting test period, and outputs the lighting test signals in accordance with the test control signals. To this end, the lighting test circuit 160 is composed of a plurality of transistors coupled between input lines (to which the lighting test signals are input) and the data lines D1 to D3m. The lighting test signals output from the lighting test circuit 160 are supplied to the data lines D1 to D3m via the data distribution circuit 140.

The lighting test circuit 160 as described above maintains a turn-off state by the bias signals supplied from the pad unit 170 during the actual driving period after the lighting test is completed.

In addition, the present invention is not limited to the case where the data distribution circuit 140 is provided, but the lighting test circuit 160 may also be coupled directly to the data lines D1 to D3m in the case where the data distribution circuit 140 is not provided.

The pad unit 170 has a plurality of pads P that transfer various driving powers and driving signals supplied from the outside to the inside of the panel 100.

With the embodiment as described above, the lighting test circuit 160 that supplies the lighting test signals to the data lines D1 to D3m is provided, instead of the data driving circuit, and the lighting test can be performed before the driving IC is mounted. Thereby, bad panels can be detected before the driving IC is mounted, making it possible to protect from unnecessary material consumption.

Figure 2:
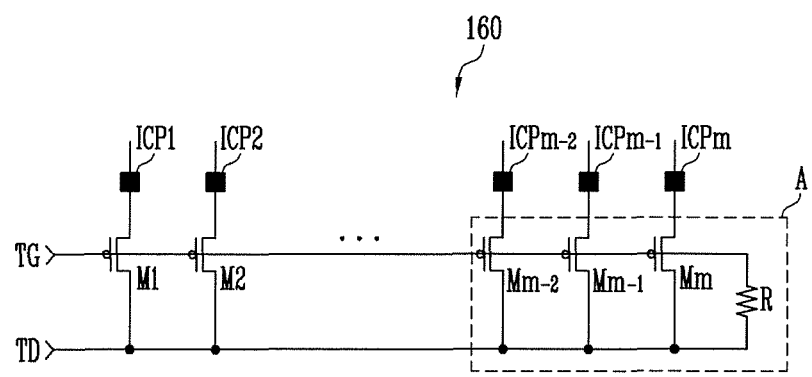
FIG. 2 is a perspective circuit diagram showing the constitution of a lighting test circuit of FIG. 1.
Figure 3:
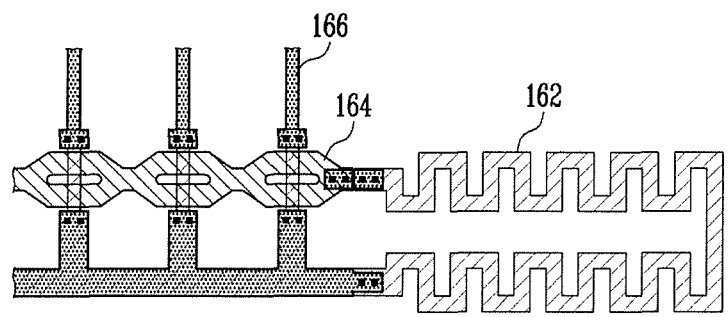
FIG. 3 is a perspective schematic plan view of the layout of region A of FIG. 2.
Figure 4:
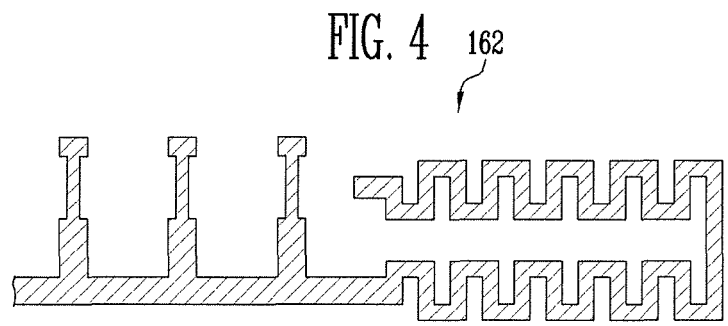
FIG. 4 is a perspective plan view showing only a semiconductor layer of FIG. 3.

FIG. 2 is a perspective circuit diagram showing the constitution of the lighting test circuit of FIG. 1. And, FIG. 3 is a perspective schematic plan view of a layout of region A of FIG. 2, and FIG. 4 is a perspective plan view showing only a semiconductor layer of FIG. 3.

First, referring to FIG. 2, the lighting test circuit 160 has a plurality of transistors M1 to Mm coupled between the input line of the lighting test signal TD and the output pads ICP1 to ICPm of the IC pads.

More specifically, the source electrodes of the transistors M1 to Mm are coupled, in common, to the input line into which the lighting test signal TD is input, and the drain electrodes thereof are coupled to the respective IC output pads ICP1 to ICPm.

Here, the respective IC output pads ICP1 to ICPm are coupled to the data lines D1 to D3m through the data distribution circuit 140 of FIG. 1, that is, the drain electrodes are coupled to the data lines D1 to D3m via the data distribution circuit 140. Also, in the case of the organic light emitting display device not having the data distribution circuit 140, the transistors M1 to Mm may be coupled directly to the data lines D1 to D3m, not via the data distribution circuit 140.

Also, the gate electrodes of the transistors M1 to Mm are coupled, in common, to the input line of the test control signal TG.

The transistors M1 to Mm as described above are simultaneously turned on by the test control signal TG supplied to turn on the transistors M1 to Mm during the lighting test period, thereby outputting the lighting test signal TD.

However, in an embodiment of the present invention, the gate electrodes and the source electrodes of the transistors M1 to Mm are coupled through a resistor R implemented using semiconductor material (composed of the semiconductor material).

In one embodiment, the resistor R may be implemented using a high-resistance polysilicon semiconductor, etc.; and, in particular, it may be formed integrated with the channel layer of the transistors M1 to Mm as shown in FIGS. 3 and 4, in order to enhance efficiency in process.

In FIGS. 3 and 4, reference numeral 162 indicates the channel layers of the integrated transistors M1 to Mm and, reference numeral 164 indicates the gate electrodes of the transistors M1 to Mm, and reference numeral 166 indicates the source and drain electrodes of the transistors M1 to Mm.

Here, the resistor R may also be integrally provided (formed simultaneously) with the transistors provided in the pixel circuit or the scan driving circuit 130, through the LTPS process, together with the transistors M1 to Mm of the lighting test circuit 160.

The resistance value of the resistor R is exemplarily set to be in a range to protect the transistors M1 to Mm from strong static electricity, not affecting the lighting test or the actual driving. For example, the resistor R may be designed to have resistance value of 100 kΩ to 1 MΩ.

The resistance value of the resistor R may vary according to the design condition of the panel 100, wherein a resistance value according to an embodiment of the present invention may be calculated and applied through a simulation, etc.

Here, in order to easily control the resistance value of the resistor R, a method of doping the polysilicon semiconductor with impurity may be used.

For example, the resistor R is integrally provided with the channel layer of the transistors M1 to Mm but only the semiconductor in the resistor R region is doped with the impurity, or the channel layer of the transistors M1 to Mm and the resistor R are doped with the same impurity but the concentration of the impurity doped in the semiconductor in the resistor R is controlled to be different from that of the channel layer of the transistors M1 to Mm, thereby making it possible to easily control the resistance value of the resistor R. Also, the impurity concentration of the channel layer of the transistors M1 to Mm and the resistor R may be set to be the same or all of them may not be doped with the impurity according to the design condition.

With the embodiment as described above, the gate electrodes and the source electrodes of the transistors M1 to Mm provided in the lighting test circuit 160 are coupled through the resistor R, making it possible to protect the lighting test circuit 160 from being damaged by static electricity.

Here, the resistance value of the resistor R is set to the range that can protect the transistors from strong static electricity, not affecting the lighting test or the actual driving so that the driving errors of the organic light emitting display device are not generated.

Figure 5:
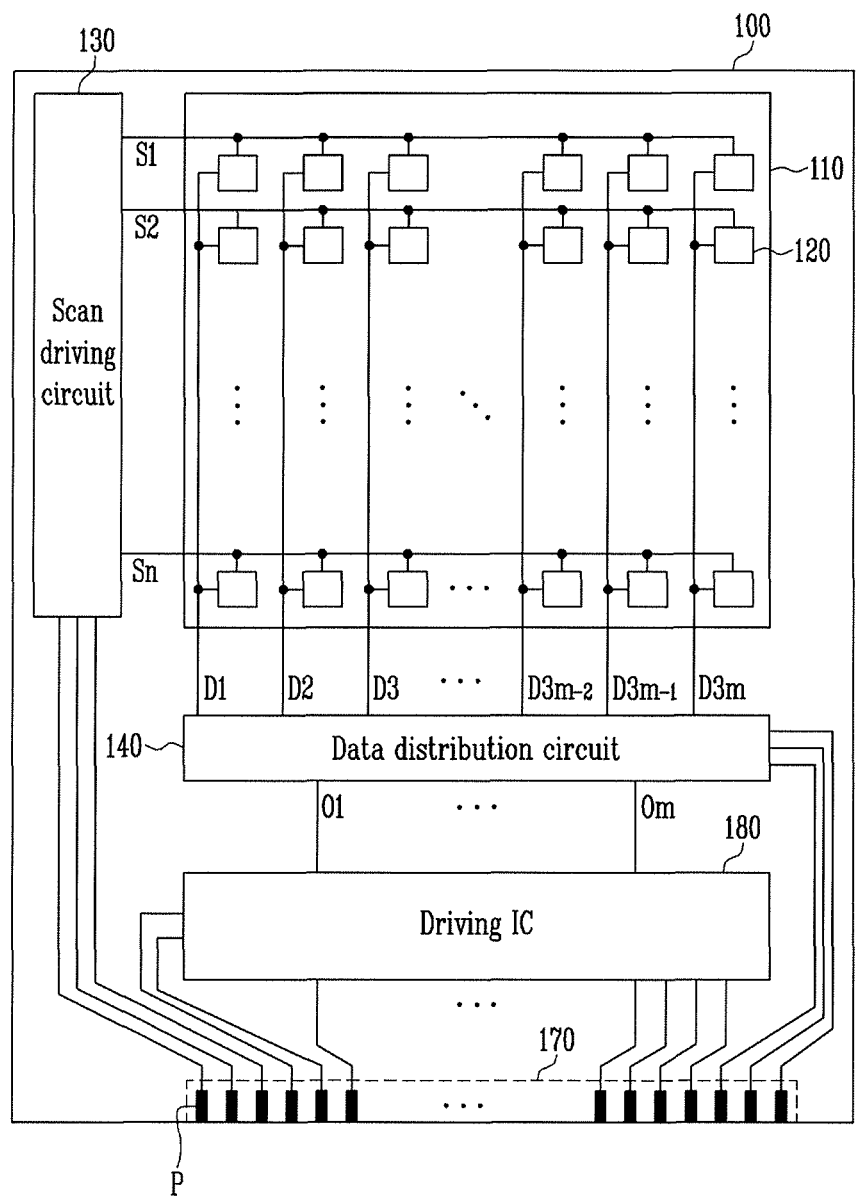
FIG. 5 is a perspective plan view of the organic light emitting display device of FIG. 1 on which a driving IC is mounted.

FIG. 5 is a perspective plan view of the organic light emitting display device of FIG. 1 on which a driving IC is mounted. Here, FIG. 5 shows the structure where a driving IC 180 is mounted on the IC mounting region 150 of FIG. 1 so that the detailed description on the portions overlapped with FIG. 1 will not be provided again in detail.

Referring to FIG. 5, the driving IC 180 may be mounted on the lighting test circuit 160, in a chip form, to be overlapped with the lighting test circuit 160 of FIG. 1 after the lighting test is completed.

The driving IC 180 as described above, having the data driving circuit built-in, generates the data signals corresponding to the data Data and the data control signals DCS and outputs the generated data signals to the data distribution circuit 140. Then, the data signals are transferred to the data lines D1 to D3m via the data distribution circuit 140.

Also, in the module state, where the data signals are supplied to the data signals D1 to D3m by the driving IC 180, the lighting test circuit 160 is maintained at a turn-off state by the bias signals from the pad unit 170.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. An organic light emitting display device comprising:
a pixel unit comprising pixels at crossing regions of scan lines and data lines;
a scan driving circuit configured to supply scan signals to the scan lines; and
a lighting test circuit configured to supply lighting test signals to the data lines,
the lighting test circuit comprising a plurality of transistors, the plurality of transistors comprising source electrodes, drain electrodes, and gate electrodes, the source electrodes being coupled, in common, to input lines to which the lighting test signals are input, the drain electrodes being coupled to the data lines, the gate electrodes being coupled, in common, to an input line of test control signals, and the gate electrodes and the source electrodes being coupled through a resistor composed of a semiconductor material,
wherein the resistor is integrally provided with a channel layer of the transistors, and
wherein the resistor is composed of a polysilicon semiconductor comprising an impurity not included in the channel layer of the transistors.

2. The organic light emitting display device as claimed in claim wherein the resistor has a resistance value of about 100 kΩ to about 1MΩ.

3. The organic light emitting display device as claimed in claim 1, further comprising:
a data distribution circuit coupled between the lighting test circuit and the data lines to distribute and configured to distribute and output the lighting test signals supplied from the lighting test circuit to the data lines during a lighting test period.

4. The organic light emitting display device as claimed in claim 1, further comprising:
a driving integrated circuit (IC) mounted in a chip form and overlapped with the lighting test circuit, the driving IC having a built-in data driving circuit.

5. An organic light emitting display device comprising:
a pixel unit comprising pixels at crossing regions of scan lines and data lines;
a scan driving circuit configured to supply scan signals to the scan lines; and
a lighting test circuit configured to supply lighting test signals to the data lines,
the lighting test circuit comprising a plurality of transistors, the plurality of transistors comprising source electrodes, drain electrodes, and gate electrodes, the source electrodes being coupled, in common, to input lines to which the lighting test signals are input, the drain electrodes being coupled to the data lines, the gate electrodes being coupled, in common, to an input line of test control signals, and the gate electrodes and the source electrodes being coupled through a resistor composed of a semiconductor material,
wherein the resistor is integrally provided with a channel layer of the transistors, and
wherein the resistor is composed of a polysilicon semiconductor comprising an impurity identical to that included in the channel layer of the transistors but doped at a different concentration from the impurity doped in the channel layer of the transistors.

6. The organic light emitting display device as claimed in claim 5, wherein the resistor has a resistance value of about 100 kΩ to about 1 MΩ.

7. The organic light emitting display device as claimed in claim 5, further comprising:
   a data distribution circuit coupled between the lighting test circuit and the data lines to distribute and configured to distribute and output the lighting test signals supplied from the lighting test circuit to the data lines during a lighting test period.

8. The organic light emitting display device as claimed in claim 5, further comprising:
   a driving integrated circuit (IC) mounted in a chip form and overlapped with the lighting test circuit, the driving IC having a built-in data driving circuit.

* * * * *